(12) United States Patent
Boldt

(10) Patent No.: US 8,874,772 B2
(45) Date of Patent: Oct. 28, 2014

(54) USING A KNOWLEDGE NETWORK FOR FILE TRANSFER PROTOCOL

(75) Inventor: Oliver Boldt, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 1117 days.

(21) Appl. No.: 12/259,717

(22) Filed: Oct. 28, 2008

(65) Prior Publication Data

US 2013/0166764 A1 Jun. 27, 2013

(51) Int. Cl.
*G06F 15/16* (2006.01)
*H04L 29/08* (2006.01)
*G06F 15/177* (2006.01)

(52) U.S. Cl.
CPC ............... *H04L 67/02* (2013.01); *H04L 67/06* (2013.01)
USPC ........................ 709/230; 709/220; 709/222

(58) Field of Classification Search
CPC ............................. H04L 67/02; H04L 67/06
USPC ......................................... 709/230, 239, 241
See application file for complete search history.

(56) References Cited

U.S. PATENT DOCUMENTS

| | | | |
|---|---|---|---|
| 5,058,034 A | 10/1991 | Murphy et al. | |
| 5,634,087 A | 5/1997 | Mammone et al. | |
| 6,973,529 B2 * | 12/2005 | Casper et al. | 710/316 |
| 7,155,578 B2 | 12/2006 | Hashem et al. | |
| 2002/0049855 A1 * | 4/2002 | Porotsky | 709/238 |
| 2003/0191811 A1 * | 10/2003 | Hashem et al. | 709/216 |
| 2006/0067294 A1 * | 3/2006 | Netravali et al. | 370/351 |
| 2006/0112170 A1 * | 5/2006 | Sirkin | 709/217 |

OTHER PUBLICATIONS

Wikipedia, List of FTP commands, http://en.wikipedia.org/wiki/List_of_FTP_commands, Jul. 15, 2008, 2 pages.
Wikipedia, Neural Network, http://en/wikipedia.org/wiki/Neural_network, Oct. 3, 2008, 8 pages.
Wikipedia, Artificial Neural Network, http://en.wikipedia.org/wiki/Artificial_Neural_network, Sep. 19, 2008, 15 pages.
Wikipedia, File Transfer Protocol, http://en.wikipedia.org/wiki/File_Transfer_Protocol, Sep. 30, 2008, 7 pages.

* cited by examiner

*Primary Examiner* — Joseph Greene
(74) *Attorney, Agent, or Firm* — Wolfe-SBMC

(57) ABSTRACT

Systems, methods, and apparatus, including software tangibly stored on a computer readable medium, involve executing file transfer protocol (FTP) operations. An FTP request is received, and a first sequence of FTP operations is executed in response to the request. The first sequence of FTP operations defines a first path in a knowledge network that includes multiple nodes. The first path includes a first subset of the nodes. A second sequence of FTP operations is executed. The second sequence of operations defines a second path in the knowledge network, and the second path includes a second subset of the nodes. The first sequence and/or the second sequence is selected as a preferred sequence of operations based at least in part on the execution of the first and second sequences of operations. An identification of the preferred sequence of operations is stored, for example, for use in responding to a subsequent FTP request.

29 Claims, 6 Drawing Sheets

USING A KNOWLEDGE NETWORK FOR FILE TRANSFER PROTOCOL

BACKGROUND

The present disclosure relates to file transfer protocol (FTP). Computers can use FTP to communicate with each other over a network, such as the Internet. For example, an FTP session may be initiated between an FTP client computer and an FTP server computer. The FTP client computer can access directories, files, and other types of data stored on the FTP server. In some examples, the FTP client performs tasks that may include retrieving a directory listing from the FTP server, retrieving a file from the FTP server, sending a file to the FTP server, and/or modifying files stored on the FTP server computer. During different FTP sessions, an FTP client computer may need to communicate with different types of FTP server computers. For example, the FTP server computers may vary with respect to their operating systems, available connection modes, available data transfer modes, output language, output style, and/or authentication techniques.

SUMMARY

This specification describes technologies relating to file transfer protocol.

In general, one aspect of the subject matter described in this specification can be embodied in a method that includes executing file transfer protocol (FTP) operations. An FTP request is received, and a first sequence of FTP operations is executed in response to the request. The first sequence of FTP operations defines a first path in a knowledge network that includes multiple nodes. The first path includes a first subset of the nodes. A second sequence of FTP operations is executed. The second sequence of operations defines a second path in the knowledge network, and the second path includes a second subset of the nodes. The first sequence and/or the second sequence is selected as a preferred sequence of operations based at least in part on the execution of the first and second sequences of operations. An identification of the preferred sequence of operations is stored. Other embodiments of this aspect include corresponding systems, apparatus, and computer program products.

These and other embodiments can optionally include one or more of the following features. Each of the nodes in the knowledge network represents a state in an FTP process. Each operation in the first sequence corresponds to a transition between two or more of the nodes in the first subset, and each operation in the second sequence corresponds to a transition between two or more of the nodes in the second subset. The nodes in the knowledge network include a start node and one or more terminal nodes. The first subset of nodes are sequenced from the start node to one of the terminal nodes. The second subset of nodes are sequenced from the start node to one of the terminal nodes. The identification of the preferred sequence is stored for use in responding to a subsequent FTP request. A first performance is detected based on the execution of the first sequence of operations. A second performance is detected based on the execution of the second sequence of operations. The first performance and the second performance are compared, and the preferred sequence is selected based at least in part on the comparison. The first performance is detected by detecting a first amount of time required to execute the first sequence. The second performance is detected by detecting a second amount of time required to execute the second sequence. The first performance is detected by detecting an error resulting from the execution of one or more operations in the first sequence. The second performance is detected by detecting a successful execution of the second sequence of operations, and the preferred sequence of operations is the second sequence of operations. The first path and/or the second path is identified by executing a backtracking algorithm to search the knowledge network for paths from the start node to one of the terminal nodes. An error resulting from the execution of one or more operations in the first sequence is detected. Based on the detected error, a problem operation is detected in the first sequence, and the second sequence does not include the problem operation. The first path is identified by identifying multiple paths in the knowledge network from the start node to one of the terminal nodes and by selecting the first path from the multiple paths. The second path is identified by selecting the second path from the multiple paths. The preferred sequence is selected based additionally on a user selection of at least one operation in the preferred sequence, a number of operations in the preferred sequence, a complexity of operations in the preferred sequence, and/or a predicted probability of occurrence of errors associated with operations in the preferred sequence. A second FTP request is received. A stored identification of the preferred sequence is retrieved in response to the received second FTP request. The preferred sequence of operations is executed based on the retrieved identification. An update is received for the knowledge network. The knowledge network is modified to include additional paths from the start node to one or more of the terminal nodes based on the received update. The file transfer protocol request includes a request to perform a process that includes establishing a connection to a remote FTP server, retrieving a directory listing from a remote FTP server, sending an electronic document to a remote FTP server, retrieving an electronic document from a remote FTP server, modifying an electronic document stored on a remote FTP server, and/or establishing an authenticated communication session with a remote FTP server. The first sequence and/or the second sequence includes an operation for connecting to a remote FTP server using an active connection mode, connecting to a remote FTP server using a passive connection mode, interpreting information received from a remote FTP server based on a particular information format, interpreting information received from a remote FTP server based on a particular language, and/or interpreting a directory listing received from a remote FTP server based on a particular directory listing style. A system includes a memory storing instructions and a processor for executing the stored instructions. The memory and the processor are included in an FTP client computer. The system further includes an FTP server that interacts with the FTP client computer as a result of the execution of the first sequence of FTP operations and/or the execution of the second sequence of FTP operations. The FTP server and the FTP client are operable to interact through a data communication network. The FTP client computer comprises a user interface device, and the FTP request is based on information received from the user interface device. The FTP client can be a personal computer. The system can also include an update server operable to send one or more updates to the FTP client.

Particular embodiments of the subject matter described in this specification can be implemented to realize one or more of the following advantages. Some implementations can provide an extensible, robust, fast, and maintainable FTP service. A sequence of operations for performing a task related to FTP can be identified quickly, based on an automated search of an FTP knowledge network. The knowledge network can be extended and/or adapted without necessarily increasing the overall complexity of the network. The automated search of the knowledge network can identify multiple possible processes for performing a requested task, and an optimal or otherwise desirable one of the identified processes can be selected for execution. If an error is detected in association with executing the selected process, an alternative process can be identified by an additional search and/or by selecting the alternative process from the previously-identified sequences. In some implementations, the knowledge network enables an FTP client to quickly and efficiently identify successful techniques for communicating with many different types of FTP servers. Further, the knowledge network can be updated, for example, when new types of operations are needed for connecting to a particular type or a particular class of FTP servers.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
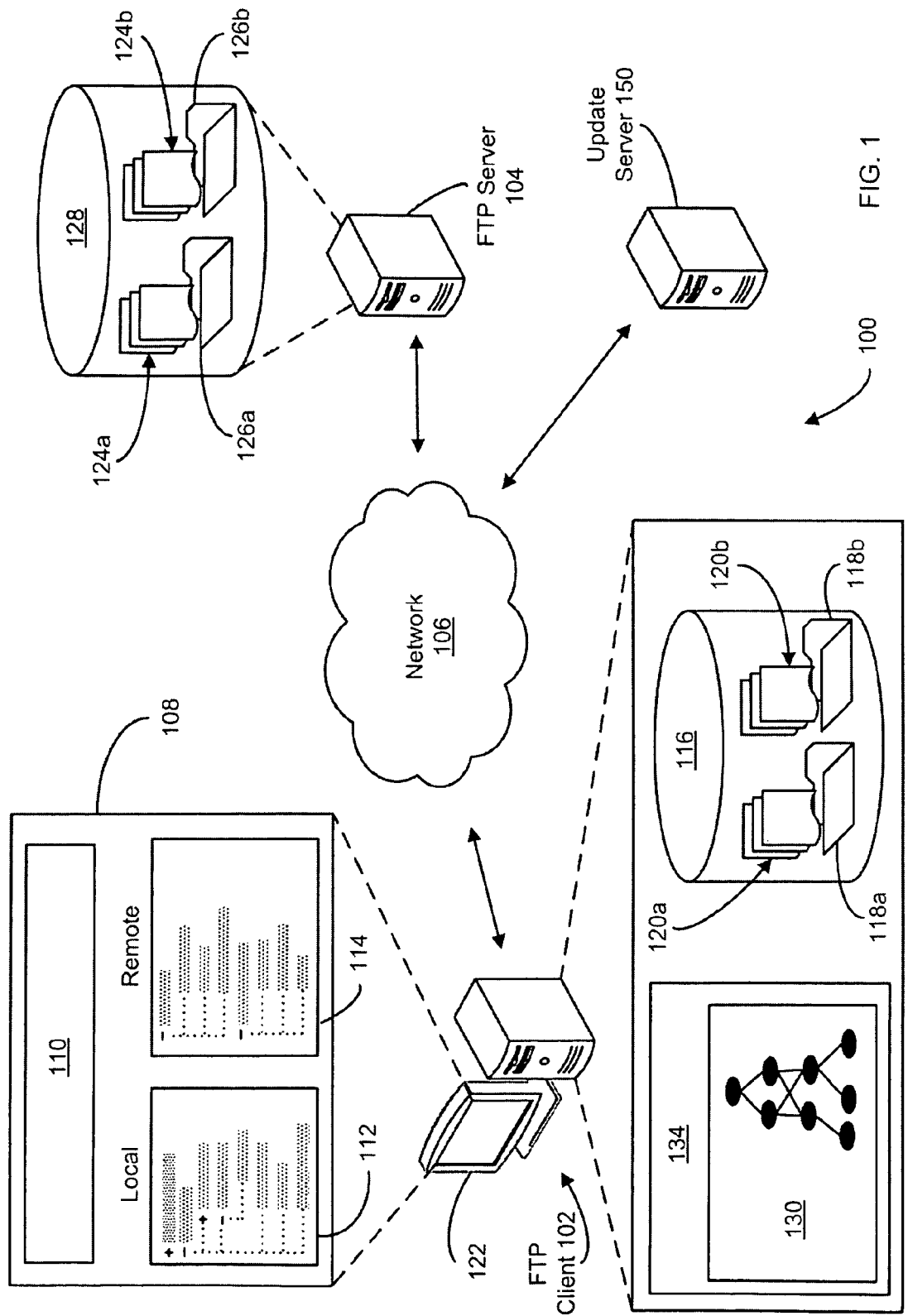
FIG. 1 is a diagram showing an example computing system for implementing file transfer protocol.
Figure 3:
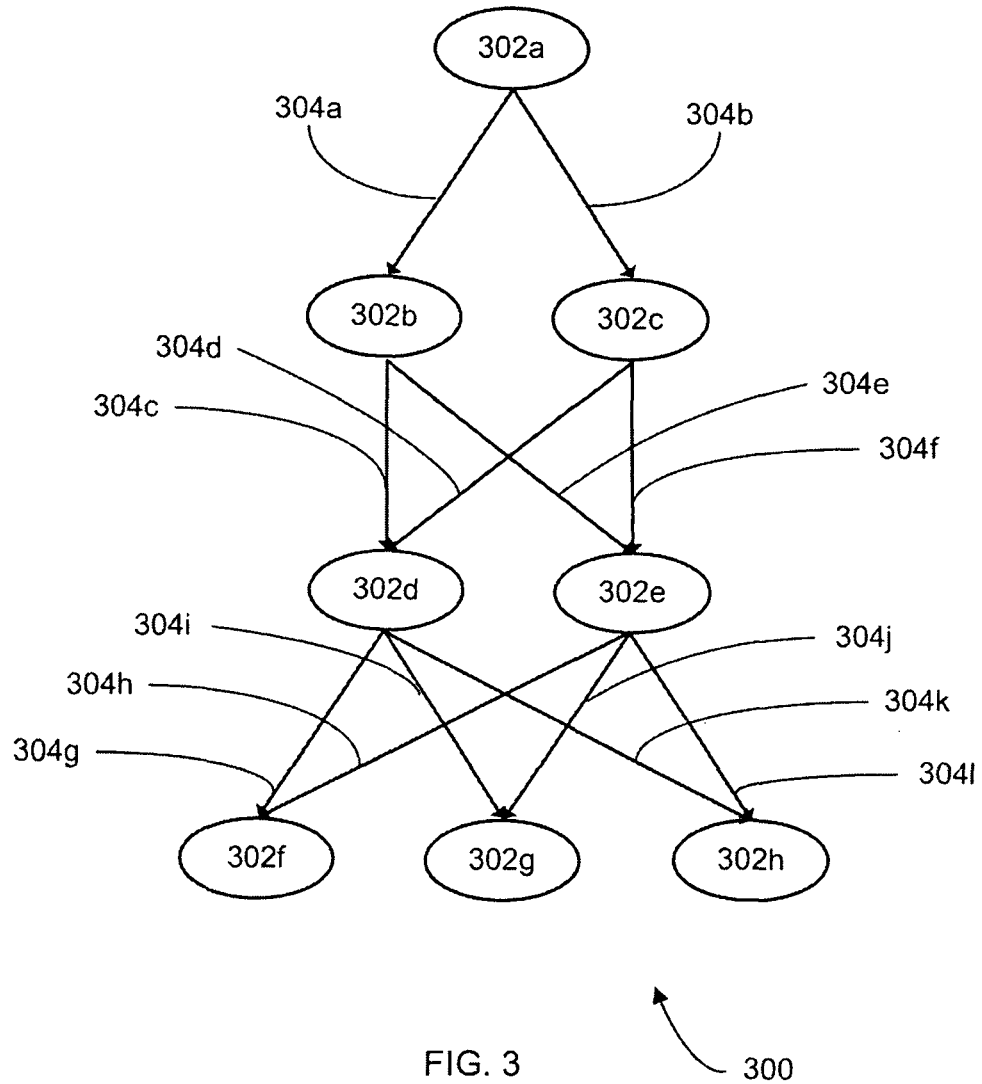
FIG. 3 is a diagram showing an example file transfer protocol knowledge network.

FIG. 1 is a diagram showing an example system 100 for implementing file transfer protocol (FTP). The system 100 includes an FTP client 102 that communicates with an FTP server 104 over a network 106. The FTP client 102 can receive a request to perform a task related to FTP. For example, a user of the FTP client 102, a software application, or another entity may request that the FTP client 102 retrieve a directory listing from the FTP server 104 and/or perform another task. Based on the request, the FTP client 102 can search a knowledge network and determine one or more sequences of operations for performing the requested task. The knowledge network (which is not to be confused with a communication network, such as the network 106) can be implemented as a data structure stored in the memory of the FTP client 102 or another computer. In some cases, the knowledge network is similar in structure to a neural network used for artificial intelligence systems. An example knowledge network 300 is shown in FIG. 3. The knowledge network can include multiple interconnected "nodes," where each node represents a state in an FTP process. The nodes in a knowledge network are connected by "transitions," where each transition represents one or more operations for transiting between the states represented by the connected nodes. A particular FTP process can be represented as a particular "path" through the knowledge network, where the transitions in the path represent the sequence of operations for performing the FTP process and the nodes in the path represent a succession of states in the FTP process. The FTP client 102 can identify a path in the knowledge network using a search algorithm, such as a backtracking algorithm. Searching the knowledge network may allow the FTP client 102 to determine acceptable and/or preferred processes for performing many different types of FTP tasks with many different types of FTP servers. Given particular constraints and/or conditions (e.g., a particular FTP server, a particular setting, mode, language, or style, etc.), the FTP client 102 can automatically determine one or more potentially acceptable and/or preferred processes for performing a requested task under the particular constraints and/or conditions. Using the knowledge network, available and/or preferred FTP solutions may be identified and/or completed more quickly, and the input required from a user may be reduced and/or used more effectively.

The FTP server 104 is a computing system that communicates with the FTP client 102 over the network 106. An example computing system 500 is shown in more detail in FIG. 5. The network 106 can include any type of wired and/or wireless communication network, such as a local area network (LAN), a wide area network (WAN), the Internet, and/or others. The FTP server 104 includes a memory 128 that stores data. The data may include files and other types of data. The files and other data may be organized in directories, subdirectories, and/or other structures. A file can be an electronic document (e.g., text file, graphics file, video file, spreadsheet file, database file, etc.), a program file, an executable file, a data file, or any other type of file capable of being stored in a machine-readable medium. In the example shown, the memory 128 includes two directories 126a and 126b. Files may be stored independent of a directory structure, or the memory 128 may include many more directories and/or subdirectories than the two directories 126 shown. Each directory includes multiple files. Directory 126a includes files 124a, and directory 126b includes files 124b. A directory may include zero files, a single file, multiple independent files, and/or multiple coordinated files.

The FTP server 104 can receive commands and/or requests from the FTP client 102 over the network 106. The FTP server 104 can perform operations based on the information received from the FTP client 102. For example, the FTP server 104 can send files 124 and/or directories 126 to the FTP client 102, the FTP server 104 can modify the files 124 and/or directories 126 in the memory 128, the FTP server 104 can receive and store additional directories and/or files in the memory 128, the FTP server 104 can send directory listings to the FTP client 102, the FTP server 104 can send information about directories 126 (e.g., directory permissions settings, etc.) and/or files 124 (e.g., file size, file permissions settings, tile type, etc.) to the FTP client 102, and/or the FTP server 104 can perform other tasks. In some cases, the FTP server 104 can send an error message to the FTP client 102, for example, if the FTP server 104 cannot understand a command or cannot perform a requested operation.

The FTP client 102 can connect to FTP servers that have a number of different properties and/or settings. That is to say that the FTP server 104 may be one of many possible variants of an FTP server. For example, the FTP client 102 may interface with FTP servers that use different authentication techniques (e.g., anonymous authentication, authentication with username and password, authentication with username only, and/or others)), different connection modes (e.g., an active or a passive connection mode), different features for directory listings (e.g., features of a directory listing resulting from different FTP commands, such as "LIST", "MLST", "MLSD", and others)), different results for standard directory listings (e.g., a directory from a Windows server, a directory listing from an Apache server or another Unix-based server, and/or others)), different natural language output (e.g., English, German, Russian, etc.), different operating systems (e.g., Unix, Red Hat, Windows, Mac, etc.), different file transfer types (e.g., single-channel or multi-channel), and/or other differences. The FTP server 104 may embody one or more of each of these possible server variations and/or other possible server variations.

The FTP client 102 is a computing system that communicates with the FTP server 104 over the network 106. As shown, the example FTP client 102 includes a memory 116, a processor 134, and a monitor 122. The monitor displays a graphical user interface 108. The FTP client 102 may also include a keyboard, a mouse, and/or other devices for receiving input from a user. The FTP client 102 may interact with a remote user, for example, over the network 106. In such a case, the interface 108 may be displayed to the remote user.

The memory 116 stores data. The data may include files and other types of data organized in directories, sub-directories, and/or other structures. In the example shown, the memory 116 includes two directories 118a and 118b. Files may be stored in the memory 116 independent of a directory structure, or the memory 116 may include many more directories and/or sub-directories than the two directories 118 shown. Each directory includes multiple files. Directory 118a includes files 120a, and directory 118b includes files 120b.

The interface 108 shown in FIG. 1 is one example of an FTP graphical user interface. An FTP program may be implemented with a different type of user interface or without a user interface at all. The example interface 108 includes a settings panel 110. The settings panel 110 may include fields for specifying properties, settings, and/or other information. For example, the settings panel 110 may include a field for specifying a particular FTP server 104 (e.g., by specifying an IP address), a field for specifying a connection mode (e.g., passive or active) and other types of settings, a field for specifying a user name and/or password for authentication with the FTP server 104, and/or a variety of other fields. The interface 108 includes a local directory listing 112 and a remote directory listing 114. The local directory listing 112 displays information about the data stored in the local memory 116 (e.g., the files 120a, 120b and the directories 118a, 118b). The remote directory listing 114 displays information about the data stored in the remote memory 128 (e.g., the files 124a, 124b and the directories 126a, 126b).

The interface 108 allows a user to make a file transfer protocol request. For example, the interface 108 may allow a user to "drag and drop" icons to request a file transfer (e.g., from the FTP server 104 to the FTP client 102 and/or from the FTP client 102 to the FTP server 104), the interface 108 may allow a user to request an authenticated FTP session with the FTP server 104, the interface 108 may allow a user to request and/or update a directory listing from the FTP server 104, the interface 108 may allow a user to modify the files 124a, 124b and/or the directories 126a, 126b. File transfer protocol requests may also be received in another manner. For example, the FTP client 102 may receive a file transfer protocol request over the network 106, from a software application or a software application module running on the FTP client 102, and/or from another source.

The processor 134 includes an FTP module 130 and may include other modules and sub-modules. The FTP module 130 can be implemented as software, firmware, and/or a combination of these. In some cases, the FTP module 130 is an FTP software application or a software application that has an FTP software component (e.g., Adobe® AIR® software, Adobe® Dreamweaver® software, Adobe® Bridge® software. Adobe® Flash® software, which are all available from Adobe Systems Incorporated of San Jose, Calif.). An FTP software component can be an integrated FTP client module of a web design software program or another type of program.

The FTP module 130 can generate the interface 108 and receive FTP requests based on user interactions with the interface 108. The FTP module 130 may access an FTP knowledge network stored locally on the FTP client 102 or on a remote device. The FTP module 130 can search the knowledge network using a backtracking algorithm or another type of search algorithm. The backtracking algorithm is discussed further with respect to the example knowledge network 300 of FIG. 3.

The FTP module 130 can search the knowledge network to identify multiple sequences of operations for performing a requested task. The FTP module 130 can choose one of the multiple identified sequences, for example, based on the complexity of the sequence, a predicted success of the sequence, a number of operations in the sequence, a user-specified option, and/or other-considerations. For example, the FTP module 130 may choose the fastest sequence, the sequence with the fewest operations, a sequence that has been successfully executed previously, a sequence that includes operations that have been successfully implemented previously, and/or based on other considerations. The FTP module 130 can enable the FTP client 102 to communicate with FTP servers having different properties and/or settings. Examples of different FTP server properties and settings are discussed above with regard to the FTP server 104. In some examples, the FTP module 130 enables the FTP client 102 to connect to an FTP server using an active or passive connection mode, interpret information received from an FTP server based on a particular information format, a particular language, and/or a particular directory listing style, and/or perform other operations.

In an example, the FTP module 130 receives a request to read a directory listing from the FTP server 104. The FTP module 130 searches the knowledge network to identify a first sequence of operations for reading a directory listing of a particular listing style (e.g., "modern" style) in a particular language (e.g., German). The FTP module 130 executes the first sequence of operations. One or more of the operations include sending to the FTP server 104 a request for a directory listing and receiving from the FTP server 104 a text file that contains the directory listing information. A subsequent operation includes reading data from the received text file. While reading the text file, the FTP module 130 detects an error when it identifies that the directory listing information is note stored in the text file according to the particular style. For example, the FTP module 130 may detect an unexpected data type or character. Alternatively or additionally, the FTP module 130 may detect an error while reading the text file when it identifies that the directory listing information is not stored in the text file according to the particular language. In either case, the FTP module 130 searches the knowledge network to identify a second sequence of operations for reading the directory listing, or the FTP module 130 identifies the second sequence based on results of an earlier search of the knowledge network. The second sequence includes operations for reading a directory listing of a different style (e.g., "old" style) and/or in a different language (e.g., English), as appropriate based on the detected errors. The FTP module 130 executes the second sequence. When the directory listing has been read from the text file, the FTP module 130 determines that the second sequence was executed successfully. The FTP module 130 stores an identification of the second sequence and/or the errors for future use. For example, the FTP module 130 may retrieve the stored identification of the second sequence in response to a subsequent request to retrieve a directory listing from an FTP server (e.g., the same FTP server 104 or another FTP server). As another example, the FTP module 130 may retrieve the stored identification of the errors when performing subsequent searches of the knowledge network, so that operations associated with the errors can be avoided.

The system 100 may also include an update server 150. The update server 150 and other features shown in FIG. 1 may be omitted in some implementations. The update server 150 is a computing system that communicates with the FTP client 102 over the network 106. The update server 150 can be a software update server that sends software updates to the FTP client 102. The updates can include additions and/or modifications to the FTP module 130, which may include additions and/or modifications to a knowledge network. For example, the update server 150 may modify a search algorithm, add additional nodes and/or transitions to a knowledge network, remove nodes and/or transitions from a knowledge network, replace and/or modify nodes in a knowledge network, and/or perform other operations. The update server 150 can receive data from the FTP client 102 and other FTP clients. For example, the update server 150 may receive information about errors detected and/or successful sequence of operations executed. In some cases, information received from many FTP clients can be aggregated to identify needed and/or helpful changes to a knowledge network, a search algorithm, and/or another aspect of an FTP module 130.

In one aspect of operation of the system 100, the FTP module 130 receives a file transfer protocol request through the interface 108. Based on the request, the FTP module 130 identifies one or more sequences of operations, selects one of the sequences, and executes the selected sequence. The FTP module 130 detects an error based oil the execution. In response to the detected error, the FTP module 130 selects a second sequence of operations and executes the second sequence. The FTP module 130 detects successful completion of the requested FTP task based on the execution of the second sequence. Data may be stored in the memory 116 based on the detected errors and/or the detected successful execution.

Figure 2:
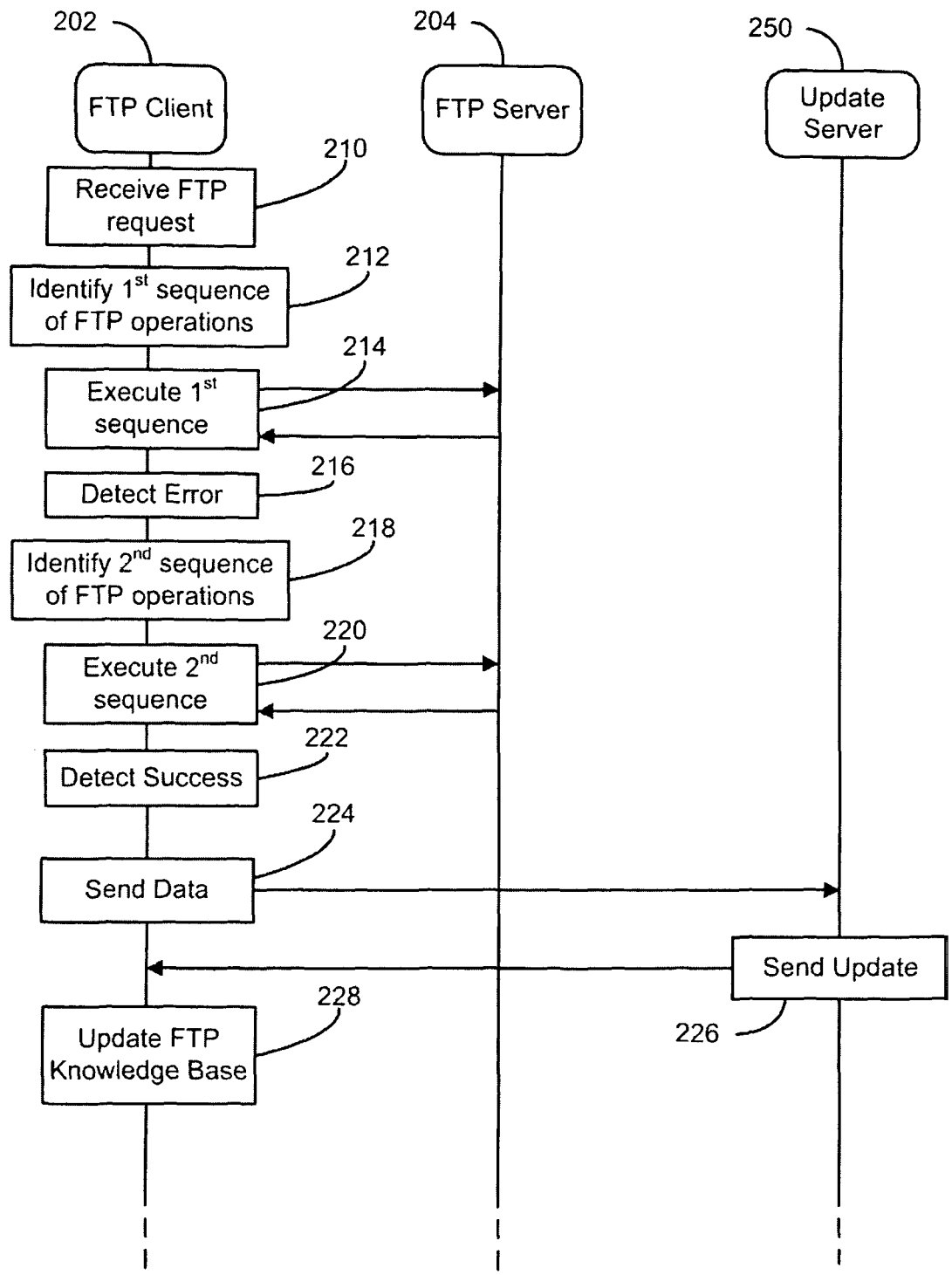
FIG. 2 is a signaling and flow diagram showing an example process for implementing file transfer protocol operations.

FIG. 2 is a signaling and flow diagram showing an example process 200 for implementing file transfer protocol operations. The process 200 includes operations and interactions of an FTP client 202, an FTP server 204, and an update server 250. The FTP client 202, the FTP server 204, and the update server 250 can be the FTP client 102, the FTP server 104, and the update server 150 of FIG. 1, respectively. The process 200 can include additional, fewer, and/or different operations in the same or a different order.

At 210, the FTP client 202 receives an FTP request. The FTP request can be received from a user, a software application, a remote or local machine, or another entity. In an example, the FTP client 202 receives a request to send a file to the FTP server 204. At 212, the FTP client 202 identifies a first sequence of FTP operations based on the request. The FTP client identifies the first sequence based on searching a knowledge network, for example, using a backtracking algorithm. The first sequence represents a first path through the knowledge network. The first path includes a first group of nodes and transitions in the knowledge network. Continuing the example, the FTP client 202 identifies a sequence of operations for sending the file to the FTP server 204.

At 214, the FTP client 202 executes the first sequence of FTP operations. While executing the first sequence, the FTP client 202 may or may not communicate with the FTP server 204. At 216, the FTP client 202 detects an error 216. For example, the FTP client 202 may attempt to send a file to the FTP server 202, and the FTP client 202 may receive an error message from the FTP server 202. In another example, the FTP client 202 may detect an error locally before or after executing operations that include communicating with the FTP server 204.

At 218, the FTP client 202 identifies a second sequence of FTP operations. The second sequence may be identified by searching the knowledge network or by selecting a sequence identified based on a previous search. The second sequence of FTP operations can be selected or identified based on the particular error detected. For example, if the error was caused by a particular operation in the first sequence, the FTP client 202 can search for a second sequence defining a path in the knowledge network that excludes the transition associated with the particular operation. As another example, the FTP client 202 can search for a second sequence defining a path in the knowledge network that excludes a node associated with a problematic transition (e.g., a node whose only outgoing transition represents a command that results in an error). If there are multiple nodes and/or transitions associated with the detected error(s), the FTP client 202 can search for a second sequence that minimizes or reduces the number of nodes and/or transitions associated with the errors.

At 220, the FTP client 202 executes the second sequence of operations. While executing the second sequence, the FTP client 202 typically communicates with the FTP server 204. For example, many FTP tasks involve sending and/or receiving data from the FTP server 204. However, some FTP tasks may be performed without requiring communication between the FTP client 202 and the FTP server 204. At 222, the FTP client 202 detects a successful execution of the second sequence of operations. For example, the FTP client 202 may identify a successful transmission of a file, successful receipt of a file, successful modification of a file, and/or another type of successful execution. Although only two sequences of operations are depicted and described, the operations of identifying and/or selecting a sequence of FTP operations, executing the selected sequence, and detecting whether the sequence is successful can be performed any number of times based on, for example, the number of different options available and whether one or more sequences are successful. Also, in some cases, it is possible that none of the attempted sequences will be successful.

At 224, the FTP client 202 sends data to the update server 250. For example, the data may identify and/or request a solution to a particular problem encountered as a result of executing of one or more FTP operations, the data may identify a current software version of the FTP client 202, the data may identify one or more particular errors detected, and/or other data. In some cases, the data may indicate one or more transitions associated with the detected errors. The data may include an error code, an identifier of the FTP client 202, an identifier of the FTP server 204, information about when the error was detected, and/or other data. At 226, the update server 250 sends an update to the FTP client 202. For example, the update server 250 may send a software version update based on a version identifier received from the FTP client 202 (at 224), or the update server 250 may send a response to a request for a solution to a particular problem. At 228, the FTP client 228 updates the FTP knowledge base based on the update received from the update server 250. The update may have the effect of removing paths from the knowledge network, adding paths to the knowledge network, modifying existing paths in the knowledge network, and/or other effects.

FIG. 3 is a diagram showing an example file transfer protocol knowledge network 300. The network 300 includes eight nodes 302a, 302b, 302c, 301d, 302e, 302f, 302g, and 302h (collectively "the nodes 302"). Pairs of the nodes 302 are connected by transitions 304a, 304b, 304c, 304d, 304e, 304f, 304g, 304h, 304i, 304j, 304k, and 304l. Each node 302 represents a state in an FTP process. Each transition 304 represents one or more operations for transitioning between the states represented by the two connected nodes 302. In an example, tile node 302a represents a "logged in" state, where the FTP client has established an authenticated FTP session with the FTP server. The transitions 304a and 304b represent two different modes of connecting to the FTP server. Transition 304a represents connecting in an active mode, and transition 304b represents connecting in a passive mode. Accordingly, node 302b represents a state of active connection between the FTP server and FTP client, and node 302c represents a state of passive connection between the FTP server and FTP client. The transitions 304c, 304d, 304e, and 304f represent different operations for retrieving directory listings. Transition 304c represents retrieving a "modern" style directory listing in the active connection mode, transition 304e represents retrieving an "old" style directory listing in the active connection mode, transition 304d represents retrieving a "modern" style directory listing in the passive connection mode, and transition 304f represents retrieving an "old" style directory listing in the passive connection mode. Accordingly, node 302d represents a state after retrieving the "modern" style listing, and node 302e represents a state after retrieving the "old" style listing. Transitions 304g-304l represent different operations for analyzing different server-dependent results. Nodes 302f, 302g, and 302h represent states that result from each of the server-dependent analysis techniques. A network may include additional, fewer, and/or different nodes in a different and/or more complex array of interconnections.

A particular FTP process can be represented as a particular path through the knowledge network 300, where the transitions 304 in the path represent the sequence of operations for performing the FTP process and the nodes 302 in the path represent the succession of states in the FTP process. A path may start at any node 302 in the network 300, and the path may end at any node that the start node can be connected to through the transitions 304 and nodes 302 in the network 300. An example path that represents a process for connecting to the FTP server in an active mode and reading a modern style directory listing begins at node 302a and ends at node 302g, as follows: transition 304a to node 302b, transition 304c to node 302d, and transition 304i to node 302g. To identify the example path, a backtracking algorithm may begin at the start node 302a and systematically search for a path to the terminal node 302g. The start node 302a may represent a current state of an FTP system, or another starting state. The terminal node 302g can represent a state corresponding to the end of a requested task. Thus, a terminal node of a path in the knowledge network 300) is not necessarily a "leaf" node or a node that has no transitions to other states, and a start node of a path in the knowledge network 300 is not necessarily a "root" node or a node that has no transitions from other states. For some requests, there are multiple possible terminal nodes; for other requests, there may be only one terminal node that represents completion of the requested task.

The backtracking algorithm may continue to search until a path from the start node to one of the terminal nodes is identified, until a path from the start node to more than one of the terminal nodes is identified, until a path of a desired length or complexity has been identified, until an exhaustive search of the network 300 has identified all possible paths between the start node and one or more of the terminal nodes, and/or until another criterion has been satisfied. In some cases, there may be errors associated with problematic transitions, for example, based on errors detected in previous executions. The backtracking algorithm can search for paths that minimize, reduce or exclude the problematic transitions. For example, if an FTP client has experienced errors connecting in the active mode, the backtracking algorithm may identify paths that do not include node 302b. In some cases, the backtracking algorithm can identify paths that include operations that have been previously successful. For example, if the FTP client has successfully connected in the passive mode, the backtracking algorithm may identify paths that include transition 304b and/or node 302c.

Figure 4A:
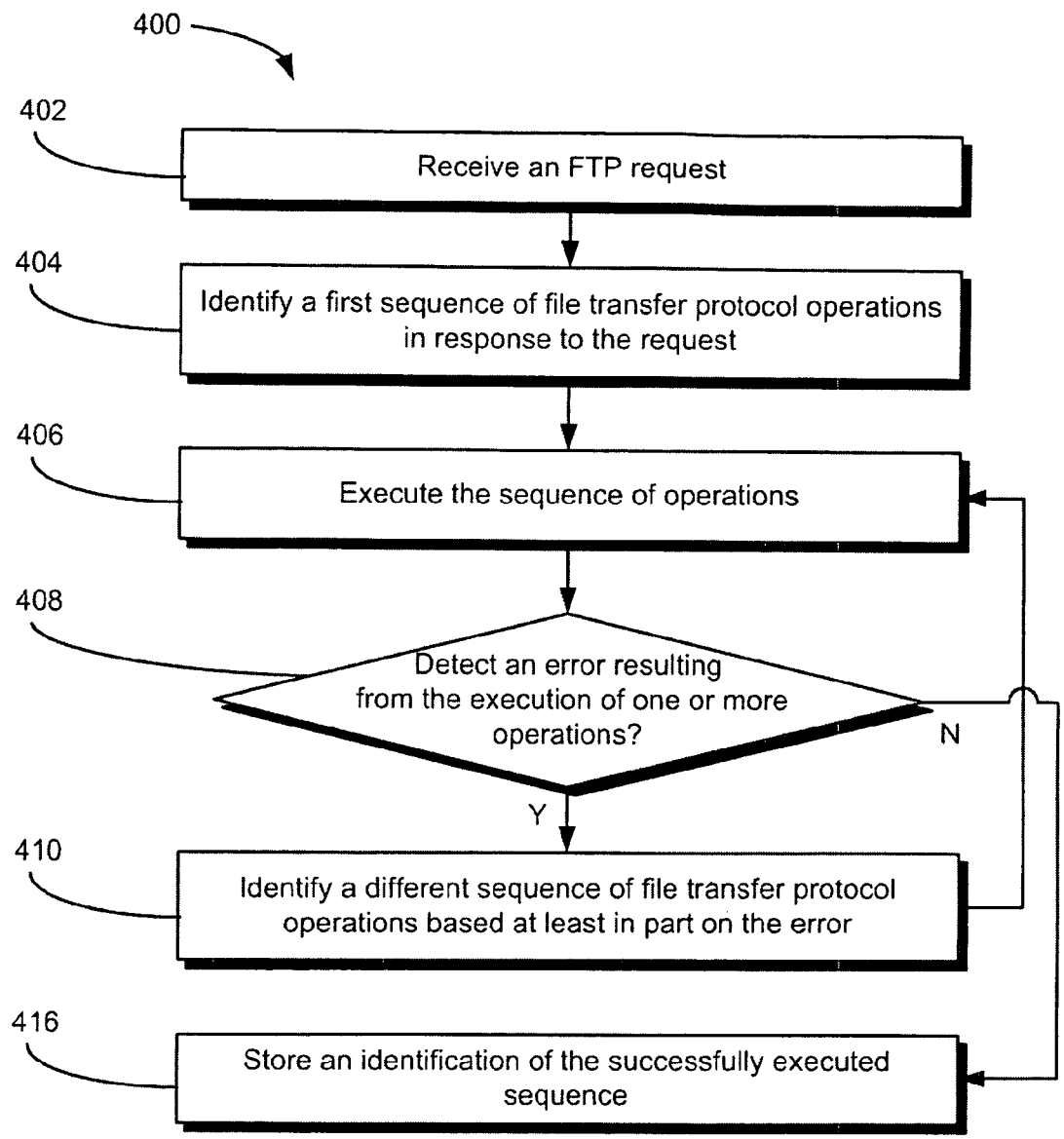
FIGS. 4A and 4B are flow diagrams showing example techniques for implementing file transfer protocol operations.

FIG. 4A is a flow diagram showing an example process 400 for implementing file transfer protocol operations. In some cases, the process 400 can be implemented in the system 100 of FIG. 1. The process 400 may be implemented by an FTP client software application or module. The process 400 can include additional, fewer, and/or different operations in the same or a different order.

At 402, an FTP request is received. The FTP request may be received by an FTP client through a user interface, a software application, a remote computing system, or another device. The FTP request may request a particular FTP task. For example, the FTP request may include a request for establishing a connection to a remote FTP server, retrieving a directory listing from a remote FTP server, sending at file to a remote FTP server, retrieving a file from a remote FTP server, modifying a file or directory stored on a remote FTP server, establishing an authenticated communication session with a remote FTP server, and/or performing another task.

At 404, a first sequence of FTP operations is identified in response to the request. The first sequence of FTP operations may define a first path in a knowledge network from a start node and a terminal node. The first path and, in some cases, additional paths may be identified by a backtracking algorithm to search the knowledge network for paths from the start node to one of multiple terminal nodes. The search may be based on information (e.g., detection of errors, detection of successful execution, and/or other types of information) collected as a result of previous executions of FTP operations. For example, as a result of previous executions of FTP operations, there may be errors associated with one or more nodes and/or transitions in a knowledge network. The first path may be selected from the multiple paths identified by the search. The first path may be selected based on a user-selected option, a number of operations in the sequence that defines the selected path, a complexity of operations in the sequence that defines the selected path, a number of errors associated with operations in the sequence that defines the selected path, or a predicted probability of occurrence of errors associated with operations in the sequence that defines the selected path.

The path includes one or more operations for performing the requested FTP processes. For example, the path can include operations for connecting to a remote FTP server using an active connection mode, connecting to a remote FTP server using a passive connection mode, interpreting information received from a remote FTP server based on a particular information format, interpreting information received from a remote FTP server based on a particular language, interpreting a directory listing received from a remote FTP server based on a particular directory listing style, and/or others.

At 406, the operations are executed. During execution, data may be transmitted to and/or received from the remote FTP server through a data communication network. Some operations may be performed locally. At 408, an error resulting from the execution of one or more operations may be detected. For example, the error may be detected by detecting unexpected data, by detecting an unexpected data type, by detecting a time out, by receiving an error message from the FTP server 104, by receiving an error message from a software application or module, by receiving an error message from another device, or by another technique.

If an error is detected, a different sequence of FTP operations is identified at 410 based at least in part on the error. An operational state and/or an operation associated with the detected error may be identified, and a sequence of operations that does not include the operation (or operational state) associated with the detected error may be determined. A node and/or a transition associated with the detected error may be identified, and a path in the knowledge network that does not include the identified node and/or transition may be determined.

At 416, an identification of the successfully executed sequence is stored. A successfully executed sequence is typically detected when no errors have been detected and/or when particular types of errors (e.g., fatal errors) have not been detected. Successful execution may be detected based on a predefined metric, the detection of a specified data type, the detection of expected data content, the detection of a user interaction, the detection of a response from the FTP server or a certain type of response from the FTP server, or another type of event. The identification of the successfully executed sequence may be stored for future use in responding to an FTP request. The stored identification may be associated with a task identified in the FTP request. In some cases, an identification of the error(s) and/or an identification of the successful sequence of operations is sent to an update server. One or more updates may be received from the update server, and the knowledge network may be modified to include additional paths from the start node to one or more of the terminal nodes based on the one or more updates.

Figure 4B:
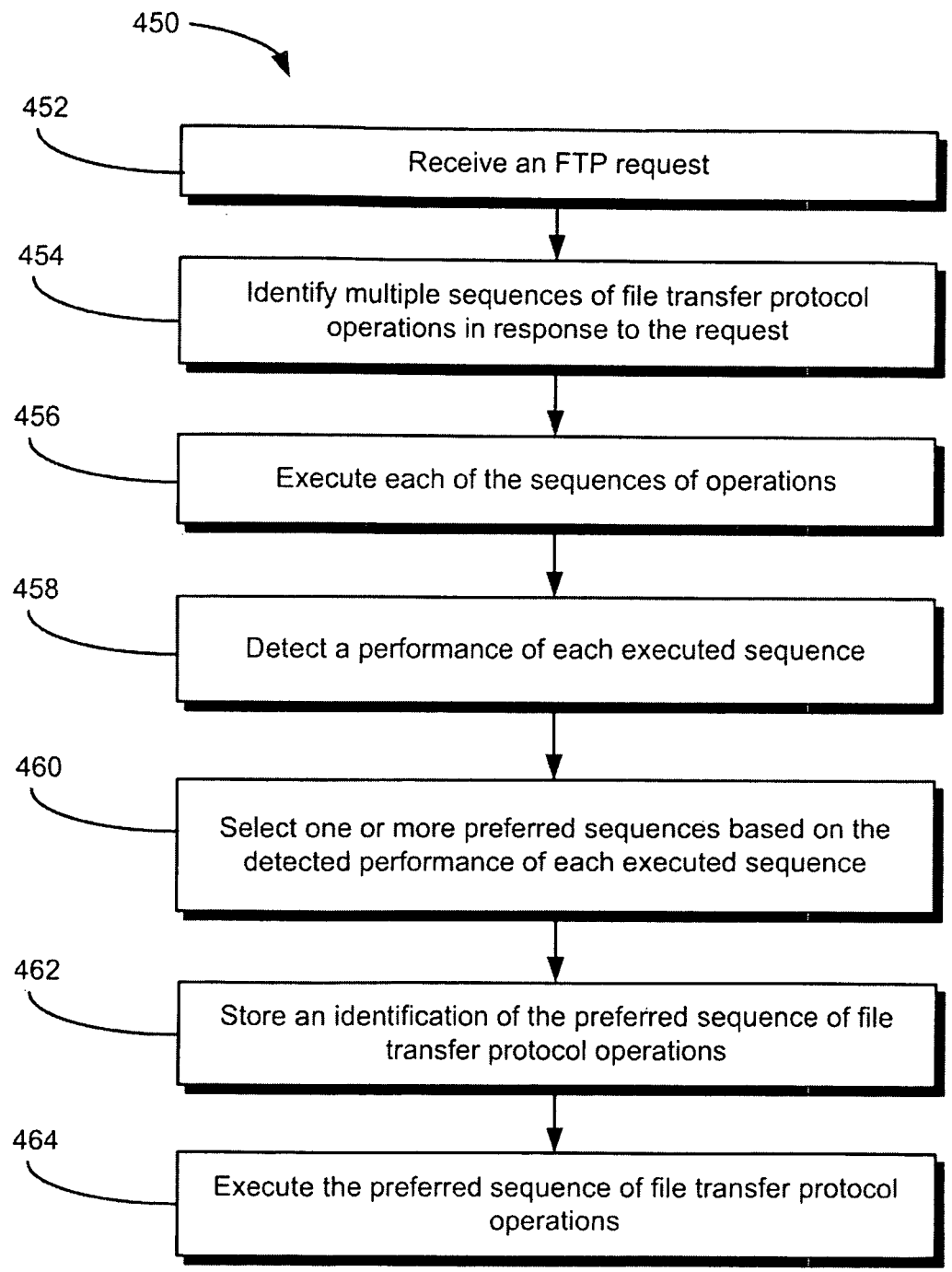

FIG. 4B is a flow diagram showing an example process 450 for implementing file transfer protocol operations. In some cases, the process 450 can be implemented in the system 100 of FIG. 1. The process 450 may be implemented by an FTP client software application or module. The process 400 can include additional, fewer, and/or different operations in the same or a different order.

At 452, a file transfer protocol request is received. At 454, multiple sequences of file transfer protocol operations are identified in response to the file transfer protocol request. At 456, each of the identified sequences are executed. In some cases, all or some of the identified sequences are executed successfully. In some cases, all or some of the identified sequences result in an error. At 458, a performance of each executed sequence is detected. For example, an error may be detected resulting from the execution of one or more sequence. As another example, a successful execution of one or more sequence may be detected. In some cases, all of the executed sequences are executed successfully, but each sequence performs differently. For example, detecting a performance may include detecting an amount of time required or used for executing a sequence or an operation, detecting a complexity of executing a sequence or an operation, detecting an amount of computing resources (e.g., memory, processor time, network resources etc.) required or used for executing a sequence or an operation, and others.

At 460, one or more of the executed sequences is selected as a preferred sequence. The preferred sequence may be selected based on a comparison of the detected performances or by another technique. For example, the preferred sequence may be the fastest sequence, the least complex sequence, the sequence requiring least resources, the sequence that does not return an error message, or another type of sequence that meets desired criteria, which may vary. At 462, an identification of the preferred sequence is stored in memory. At 464, the preferred sequence of file transfer protocol operations are executed. For example, the identification of the preferred sequence may be retrieved from memory based on a subsequent file transfer protocol request, and the preferred sequence may be executed based on the stored identification.

Figure 5:
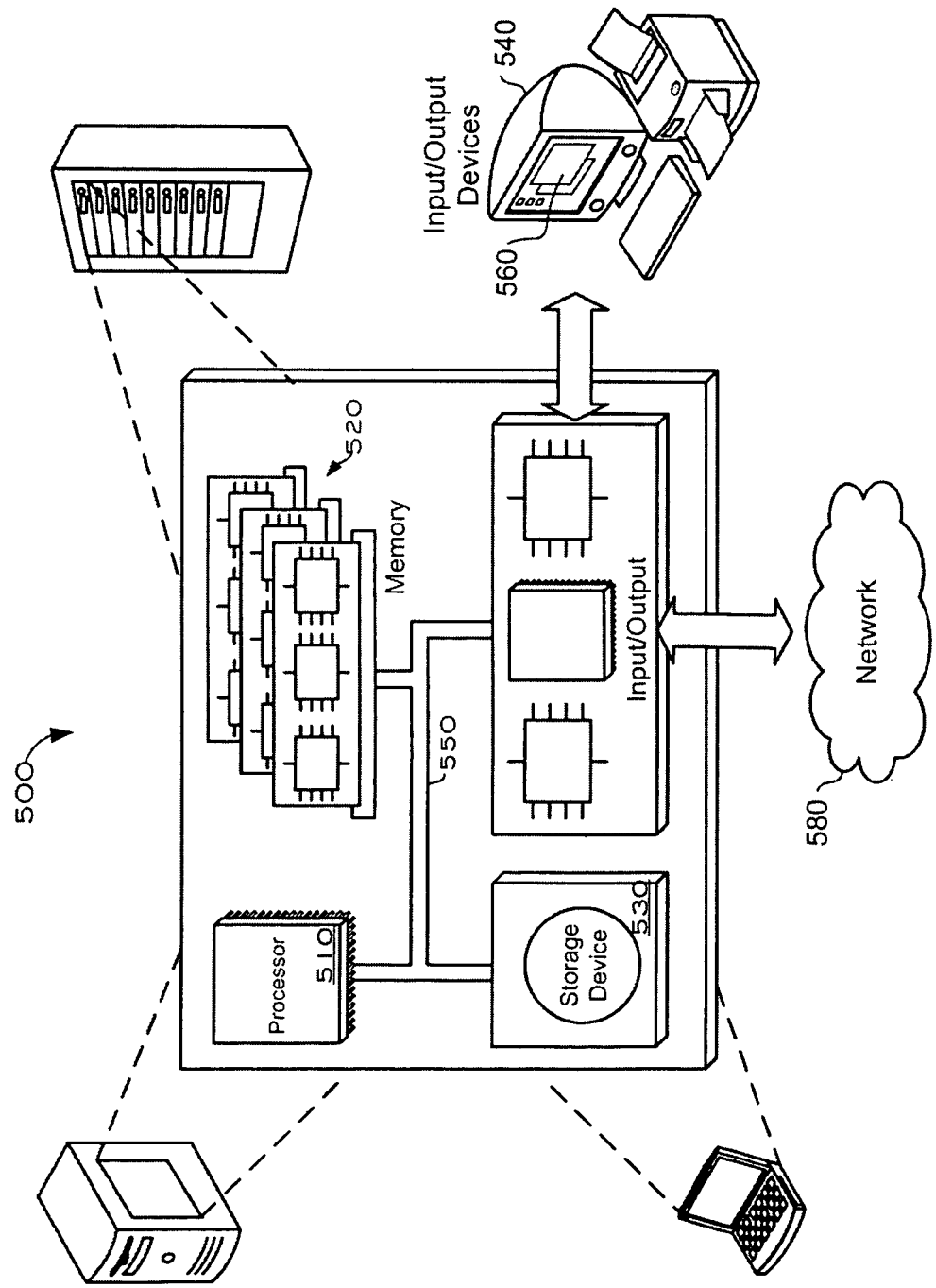
FIG. 5 is a diagram showing an example computer system.

An example computer system is shown in FIG. 5, which shows a block diagram of a programmable processing system (system) 500 suitable for implementing apparatus or performing methods of various aspects of the subject matter described in this specification. The example system 500 includes a processor 510, memory 520, a storage device 530, and one or more input/output devices 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output devices 540.

The memory 520 is a computer readable medium such as volatile or non-volatile memory that stores information within the system 500. The memory 520 can store data structures representing files, electronic documents and other types of information. The storage device 530 is capable of providing persistent storage for the system 500. The storage device 530 may be a floppy disk device, a hard disk device, an optical disk device, or a tape device, or other suitable persistent storage means. The input/output devices 540 provide input/output operations for the system 500. In some implementations, the input/output devices 540 include a keyboard and/or pointing device. In other implementations, the input/output devices 540 include a display unit for displaying graphical user interfaces 560. The system 500 can be connected to a network 580, such as the Internet, an intranet, or an ad hoc network. Information can be accessed and read from the network 580, such as electronic documents and their contents. The system 500 can connect through the network 580 to a remote computer system to implement file transfer protocol. For example, in various aspects of operation, the system 500 may operate as a file transfer protocol client, a file transfer protocol server, an update server, and/or others.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer cam be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode r ay tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"). e.g., the Internet.

The computing system can include clients and servers. A client and server are generally remote from each other and typically interact through a communication network. The relationship of client and server arises by virtue of computer programs running oil the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Moreover, aspects of the examples and concepts described above can be implemented in various protocols such as FTP, SFTP ("secure FTP"), FTP over SSL ("secure sockets layer"), and/or others.

What is claimed is:

1. A method comprising:
receiving a file transfer protocol (FTP) request at a computing device comprising an FTP module, the FTP request requesting that an FTP task be performed;
identifying, in response to the request and by the FTP module of the computing device, a first sequence of FTP operations that enable the FTP task to be performed, the first sequence of FTP operations being identified from a knowledge network comprising a plurality of nodes and transitions between the nodes, each of the nodes representing a logical state of an FTP process and each of the transitions representing at least one said FTP operation for achieving the logical state of the FTP process represented by a transitioned-to node, the first sequence of FTP operations corresponding to a first path in the knowledge network that comprises a first subset of the nodes having the transitions that represent the first sequence of FTP operations;

identifying, in response to receiving an error in association with execution of the first sequence and by the FTP module of the computing device, a second sequence of FTP operations that enable the FTP task to be performed, the second sequence of FTP operations being identified from the knowledge network and corresponding to a second path in the knowledge network that comprises a second subset of the nodes having the transitions that represent the second sequence of FTP operations;

selecting at least one of the first sequence or the second sequence as a preferred sequence of operations based at least in part on the execution of the first sequence and execution of the second sequence; and storing, at the computing device, an identification of the preferred sequence of operations.

2. The method of claim 1, wherein the plurality of nodes comprises a start node and at least one terminal node, the first subset of the nodes are sequenced from the start node to one of the terminal nodes, and the second subset of the nodes are sequenced from the start node to one of the terminal nodes.

3. The method of claim 2, wherein the identification of the preferred sequence of operations is stored for use in responding to a subsequent FTP request.

4. The method of claim 2, further comprising:
detecting a first performance based on the execution of the first sequence;
detecting a second performance based on the execution of the second sequence; and
comparing the first performance and the second performance, wherein the preferred sequence is selected based at least in part on the comparison.

5. The method of claim 4, wherein detecting the first performance comprises detecting a first amount of time to execute the first sequence, and detecting the second performance comprises detecting a second amount of time taken to execute the second sequence.

6. The method of claim 4, wherein detecting the first performance comprises detecting the error received in association with the execution of the first sequence, the error resulting from execution of one or more of the FTP operations in the first sequence, detecting the second performance comprises detecting a successful execution of the second sequence, and the preferred sequence of operations comprises the second sequence of operations.

7. The method of claim 2, wherein at least one of the first sequence or the second sequence is identified by executing a backtracking algorithm that is effective to search the knowledge network for paths from the start node to one of the terminal nodes.

8. The method of claim 2, further comprising:
detecting the error received in association with the execution of the first sequence as a result of execution of one or more of the FTP operations in the first sequence; and
identifying a problem operation in the first sequence based on the detected error, wherein the second sequence does not include the problem operation.

9. The method of claim 2, further comprising:
identifying the first sequence by identifying a plurality of paths in the knowledge network from the start node to one of the terminal nodes and selecting the first path from the plurality of paths; and
identifying the second sequence by selecting the second path from the plurality of paths.

10. The method of claim 2, wherein the preferred sequence is selected based additionally on at least one of:
a user selection of at least one operation in the preferred sequence;
a number of operations in the preferred sequence;
a complexity of operations in the preferred sequence; or
a predicted probability of occurrence of errors associated with operations in the preferred sequence.

11. The method of claim 2, further comprising:
receiving a second FTP request;
retrieving the stored identification of the preferred sequence in response to the received second FTP request; and
executing the preferred sequence of operations based on the retrieved identification.

12. The method of claim 2, further comprising:
receiving an update for the knowledge network; and
modifying the knowledge network to include additional paths from the start node to one or more of the terminal nodes based on the received update.

13. The method of claim 2, wherein the FTP task to be performed comprises at least one of:
establishing a connection to a remote FTP server;
retrieving a directory listing from a remote FTP server;
sending an electronic document to a remote FTP server;
retrieving an electronic document from a remote FTP server;
modifying an electronic document stored on a remote FTP server; or
establishing an authenticated communication session with a remote FTP server.

14. The method of claim 2, wherein at least one of the first sequence or the second sequence comprises an FTP operation for:
connecting to a remote FTP server using an active connection mode;
connecting to a remote FTP server using a passive connection mode;
interpreting information received from a remote FTP server based on a particular information format;
interpreting information received from a remote FTP server based on a particular language;
interpreting a directory listing received from a remote FTP server based on a particular directory listing style; or
retrieving a directory listing that is styled according to one of multiple different directory listing styles.

15. A computer-readable memory, storing instructions that are executable by a computing device to perform operations comprising:
receiving a file transfer protocol (FTP) request that requests an FTP task to be performed;
identifying, by an FTP module implemented on the computing device, a first sequence of FTP operations that enable the FTP task to be performed, the first sequence of FTP operations being identified from a knowledge network comprising a plurality of nodes and transitions between the nodes, each of the nodes representing a logical state of an FTP process and each of the transitions representing at least one said FTP operation for achieving the logical state of the FTP process represented by a transitioned-to node, the first sequence of FTP operations corresponding to a first path in the knowledge network that comprises a first subset of the nodes having the transitions that represent the first sequence of FTP operations;

identifying, by the FTP module, a second sequence of FTP operations that enable the FTP task to be performed, the second sequence of FTP operations being identified from the knowledge network and corresponding to a second path in the knowledge network that comprises a second subset of the nodes having the transitions that represent the second sequence of FTP operations;

selecting at least one of the first sequence or the second sequence as a preferred sequence of operations based at least in part on execution of the first sequence and execution of the second sequence; and storing an identification of the preferred sequence of operations.

16. The computer-readable memory of claim 15, wherein the plurality of nodes comprises a start node and at least one terminal node, the first subset of the nodes are sequenced from the start node to one of the terminal nodes, and the second subset of the nodes are sequenced from the start node to one of the terminal nodes.

17. The computer-readable memory of claim 16, wherein the identification of the preferred sequence of operations is stored for use in responding to a subsequent FTP request.

18. The computer-readable memory of claim 16, wherein the operations further comprise:

detecting a first performance based on the execution of the first sequence;

detecting a second performance based on the execution of the second sequence; and comparing the first performance and the second performance, wherein the preferred sequence is selected based at least in part on the comparison.

19. The computer-readable memory of claim 16, wherein at least one of the first sequence or the second sequence is identified by executing a backtracking algorithm that is effective to search the knowledge network for paths from the start node to one of the terminal nodes.

20. The computer-readable memory of claim 16, wherein the operations further comprise:

detecting an error resulting from execution of one or more of the FTP operations in the first sequence; and identifying a problem operation in the first sequence based on the detected error, wherein the second sequence does not include the problem operation.

21. A system comprising:

at least one processor; and a memory comprising instructions, wherein the instructions are executable by the at least one processor to perform operations comprising:

receiving a file transfer protocol (FTP) request that requests an FTP task to be performed;

identifying a first sequence of FTP operations that enable the FTP task to be performed, the first sequence of FTP operations being identified from a knowledge network comprising a plurality of nodes and transitions between the nodes, each of the nodes representing a logical state of an FTP process and each of the transitions representing at least one said FTP operation for achieving the logical state of the FTP process represented by a transitioned-to node, the first sequence of FTP operations corresponding to a first path in the knowledge network that comprises a first subset of the nodes having the transitions that represent the first sequence of FTP operations;

identifying a second sequence of FTP operations that enable the FTP task to be performed, the second sequence of FTP operations being identified from the knowledge network and corresponding to a second path in the knowledge network that comprises a second subset of the nodes having the transitions that represent the second sequence of FTP operations;

selecting at least one of the first sequence or the second sequence as a preferred sequence of operations based at least in part on execution of the first sequence and execution of the second sequence; and store an identification of the preferred sequence of operations.

22. The system of claim 21, wherein the plurality of nodes comprises a start node and at least one terminal node, the first subset of the nodes are sequenced from the start node to one of the terminal nodes, and the second subset of the nodes are sequenced from the start node to one of the terminal nodes.

23. The system of claim 22, wherein the identification of the preferred sequence of operations is stored for use in responding to a subsequent FTP request.

24. The system of claim 22, wherein at least one of the first sequence or the second sequence is identified by executing a backtracking algorithm that is effective to search the knowledge network for paths from the start node to one of the terminal nodes.

25. The system of claim 22, wherein the at least one processor and the memory are part of a client computing device configured to interact with a server computing device as a result of at least one of the execution of the first sequence or the execution of the second sequence.

26. The system of claim 25, wherein the client computing device is configured to interact with the server computing device through a data communication network.

27. The system of claim 25, further comprising a display device configured to present a user interface, and the FTP request is based on information received via the user interface.

28. The system of claim 25, wherein the client computing device comprises a personal computer.

29. The system of claim 25, wherein the client computing device is configured to receive one or more updates from an update server that are effective to modify the knowledge network to include additional paths from the start node to one or more of the terminal nodes.

* * * * *